W. SCARLETT.
Grinding Mill.
No. 20,734.
Patented June 29, 1858.
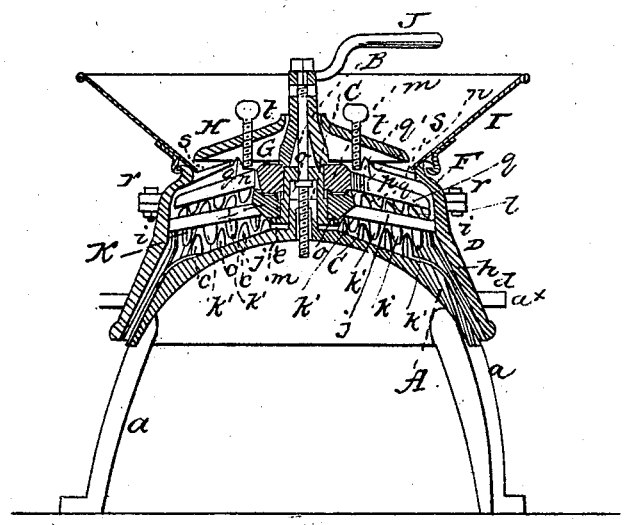
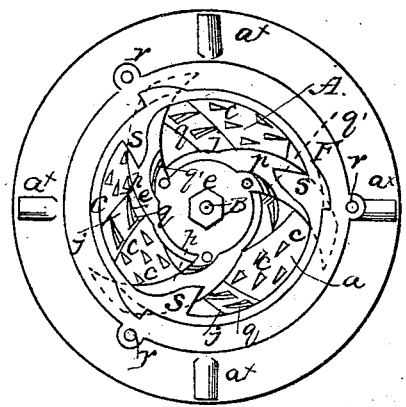
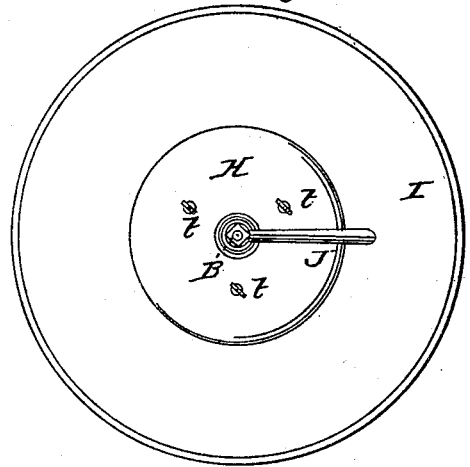

UNITED STATES PATENT OFFICE.

W. SCARLETT, OF KENOSHA, WISCONSIN.

GRINDING-MILL.

Specification of Letters Patent No. 20,734, dated June 29, 1858.

*To all whom it may concern:*

Be it known that I, WILLIAM SCARLETT, of Kenosha, in the county of Kenosha and State of Wisconsin, have invented a new and Improved Grinding-Mill; and I do hereby declare that the following is a full, clear, and exact description of the same, reference being had to the annexed drawings, making a part of this specification, in which—

Figure 1, is a vertical central section of my improvement. Fig. 2, is a plan or top view of ditto, the hopper and adjustable feed plate being removed. Fig. 3, is a plan or top view of ditto, showing the hopper and adjustable feed plate.

Similar letters of reference indicate corresponding parts in the several figures.

This invention relates to an improvement in that class of grinding mills which are constructed of cast iron, generally termed portable and operated usually by animal power for the purpose of grinding corn and cob, and other substances for food for stock.

The invention consists, 1st, in a novel arrangement of certain parts whereby said parts may be connected in the simplest possible way, the construction of the mill rendered very simple and the principal bearing of its working parts kept at all times in a perfectly lubricated state.

The invention consists 2nd, in a peculiar crushing device arranged as hereinafter shown whereby ears of corn may be crushed with a moderate expenditure of power.

The invention consists, 3rd, in the employment or use of an adjustable feed plate placed within the hopper and arranged as hereinafter shown so as to regulate the supply of small grain to the mill and prevent the choking or clogging of the same.

To enable those skilled in the art to fully understand and construct my invention I will proceed to describe it.

A, represents a cast iron shell which is supported by legs ($a'$) at a suitable height. The exterior surface of the shell is of convex form and has two surfaces ($a$), ($b$), inclined at different angles, the upper surface ($a$) having vertical teeth ($c$) formed on it and the lower surface ($b$), being corrugated as shown at ($d$) so as to form rather fine cutting surfaces. At the apex of the shell A, a vertical polygonal shaped hub ($e$) is formed and the lower part of a vertical screw rod B, is fitted therein, the hub having a screw thread formed in it so that by turning the rod B, it may be raised and lowered. On the rod B, a collar ($f$) is formed said collar being just above the screw portion of the rod.

C, is a thimble the interior of which is of polygonal form corresponding to the hub ($e$) over which it is fitted, the thimble resting on the collar ($f$) on rod B, as shown clearly in Fig. 1. The lower end of the thimble C, has a flanch ($g$) projecting from it at right angles and this flanch forms the bearing of a rotating shell D, which encompasses the stationary shell A. The shell D, corresponds to the lower part ($b$) of the shell A, and its inner surface with the exception of its upper part is finely corrugated as shown at ($h$) and in somewhat oblique form. The upper part of the internal surface of the shell is provided with coarser corrugations ($i$). At the upper part of the shell D, there are four curved arms ($j$) which extend across it and have their inner ends connected with an annular plate or hub ($k$), the bottom of which rests on the flanch ($g$) of the thimble C. The under surfaces of the arms ($j$) are provided with teeth ($k'$) which as the shell D, rotates, work or pass between the teeth ($c$) on the upper part of the shell A, and the upper surfaces of the arms ($j$) are also provided with teeth ($l$).

E, represents an annular plate or hub which rests on the plate or hub ($k$). The bottom of the hub E, is provided with an annular projection ($m$) which fits between and bears upon two annular ledges or vertical rims ($n$), ($o$), on the upper surface of the plate or hub ($k$), the rim or ledge ($o$) being at the inner side of the plate or hub ($k$) and not quite so high as the rim or ledge ($n$) at the outer side. The aperture or central hole of the annular hub E, is of polygonal form and fits over the upper end of the thimble C, which is of corresponding form the lower part of the thimble being cylindrical so that the hub ($k$) may turn around it. The plate or hub E, is stationary being prevented from turning on account of the polygonal form of its center hole or opening fitting over the upper part of the thimble which is of corresponding form, the thimble being prevented from turning on account of having a polygonal interior and fitting over the corresponding shaped hub ($e$) on the shell A. The plate or hub E, has three curved arms ($p$) attached, said arms being curved in an opposite direction to the arms (*j*) of the shell D. On the under surfaces of the arms (*p*), teeth (*q*) are attached between which the teeth (*l*) on the upper surfaces of the arms (*j*) of the shell D pass as the shell D, rotates. At the upper surface of each arm (*p*) and adjoining the plate or hub E, there is a projection or cutter (*q′*) and to the upper end of the shell D, there is attached by bolts (*r*) an annular cap or flanch F, having cutters (*s*) attached which project inward in a slightly inclined position and within a short distance of the cutters (*q′*), four cutters (*s*) are shown in Fig. 2, but more or less may be used.

G, is a conical boss fitted on the rod B, its lower end resting on the plate E, and H, is a conical shaped plate or casting which is fitted on the boss G and has screws (*t*) passing through it, said screws resting on the plate or hub E.

I, is a hopper the lower end of which is secured to the upper end of the cap or flanch F, in any proper way. On the upper end of the rod B, a handle J, is placed, the boss G, serving as a bearing therefor, and on the exterior of the shell D, lugs ($a^{xx}$) are formed to which the sweep is connected.

The operation is as follows: If the ears of corn are ground whole, that is the corn and cobs together, the plate H, is removed from the hopper I, and the shell D, is rotated, the hopper I, being filled with the ears of corn, and the ears are crushed by the cutters (*q′*), (*s*), near the center of the mill and therefore with a less expenditure of power than if crushed nearer the sides, the ears in consequence of the rotation of the hopper being kept constantly agitated. The crushed ears pass down between the arms (*p*), (*j*), and are crushed a degree finer and are completely ground by passing down between the arms (*j*) and the upper part (*a*) of the shell A, when they are subjected to the action of the teeth (*k′*), (*c*) and thence passing down between the shell D, and the lower part (*b*) of the shell A. The space between the projection (*m*) on the under side of the hub E, and the upper surface of the hub (*k*) forms an oil chamber which not only keeps said bearing well lubricated but in consequence of the innermost ledge (*o*) not being as high as the outer one (*n*) the oil is allowed to overflow and pass down between the thimble C, and boss (*k*) and upon the flanch (*g*), thereby lubricating the bearing of the shell D. It will be seen that the shell D, and arms (*j*) may be raised and lowered by turning the rod B, by means of the handle J, so that the space between the grinding surfaces of said part may be increased or diminished according to the degree of fineness the article is to be ground, said adjustment being due to the bearing of the thimble C, on the collar (*f*). When shelled corn or small grain is to be ground the plate H, is placed within the hopper and adjusted by means of the screws (*t*) to the desired height so that the grain may be fed to the mill in proper quantities, or just as fast as it is ground and the choking or clogging of the mill avoided.

I do not claim broadly the screw rod with nut at the top for adjusting the grinding surfaces, nor do I claim broadly the employment of crushing knives or blades above the grinding surfaces, but What I do claim as my invention and desire to secure by Letters Patent, is—

1. The combination of the screw rod B, *f*, J, thimble C, *g*, and separated hubs E, *k*, *e*, *m*, *n*, *o*, in the particular manner shown, and for the purposes herein described.

2. The arrangement of the conical feed plate in the bottom of the hopper loosely over the central box of the central screw, and so as to be adjusted vertically by means of set screws, independently of the crushing and grinding devices, in the manner and for the purposes herein set forth.

3. The arrangement of the cutters *q′*, so that their vertical edge shall only nearly touch the horizontal edge of the cutters *s*, and thus insure the crushing of the corn &c. between the same at a point near the center of the mill, substantially as and for the purposes set forth.

WILLIAM SCARLETT.

Witnesses:
SILAS AMES,
M. PENNSEY.